(12) United States Patent
Zhao et al.

(10) Patent No.: US 11,893,552 B2
(45) Date of Patent: Feb. 6, 2024

(54) DISTRIBUTED CONSENSUS ALGORITHM AND APPARATUS FOR RAPIDLY GENERATING BLOCK

(71) Applicants: Xi'an University of Posts & Telecommunications, Xi'an (CN); Xi'an Anmeng Intelligent Technology Co., Ltd., Xi'an (CN)

(72) Inventors: Feng Zhao, Xi'an (CN); Jingyu Feng, Xi'an (CN)

(73) Assignees: Xi'an University Of Posts & Telecommunications, Xi'An (CN); Xi'an Anmeng Intelligent Technology Co., Ltd., Xi'An (CN)

( * ) Notice: Subject to any disclaimer, the term of this patent is extended or adjusted under 35 U.S.C. 154(b) by 310 days.

(21) Appl. No.: 17/616,975

(22) PCT Filed: Dec. 24, 2019

(86) PCT No.: PCT/CN2019/127705
§ 371 (c)(1),
(2) Date: Dec. 6, 2021

(87) PCT Pub. No.: WO2020/244197
PCT Pub. Date: Dec. 10, 2020

(65) Prior Publication Data
US 2022/0327503 A1      Oct. 13, 2022

(30) Foreign Application Priority Data
Jun. 6, 2019    (CN) .......................... 201910491737.0

(51) Int. Cl.
G06Q 20/06      (2012.01)
G06Q 20/40      (2012.01)

(52) U.S. Cl.
CPC .......... *G06Q 20/065* (2013.01); *G06Q 20/40* (2013.01); *G06Q 2220/00* (2013.01)

(58) Field of Classification Search
None
See application file for complete search history.

(56) References Cited

U.S. PATENT DOCUMENTS 10,841,372 B1 * 11/2020 Ram ...................... H04L 65/80
2019/0370793 A1 * 12/2019 Zhu ...................... G06Q 20/06
(Continued)

FOREIGN PATENT DOCUMENTS

| CN | 101714976 A | * | 5/2010 |
| CN | 109949034 A | * | 6/2019 |

(Continued)

OTHER PUBLICATIONS

Mastering Bitcoin by Andreas M. Antonopoulos, Copyright © 2010 Andreas M. Antonopoulos LLC (Year: 2010).*

*Primary Examiner* — Neha Patel
*Assistant Examiner* — Jahed Ali
(74) *Attorney, Agent, or Firm* — Harness, Dickey & Pierce, P.L.C.

(57) ABSTRACT

The present disclosure discloses a distributed consensus algorithm and apparatus for rapidly generating a block. The algorithm includes: broadcasting a new transaction to all nodes (S110); collecting, by each of the nodes, the new transaction into a block (S120); evaluating a trust value of each of the nodes to obtain an evaluation result (S130); selecting honest miners according to the evaluation result (S140); obtaining negotiation rules (S150); creating, by the honest miners, a new block according to the negotiation rules, and broadcasting the new block to all the nodes (S160); and when all transactions in the nodes are valid but (Continued)

do not take effect, receiving the new block and adding the new block to a blockchain (S170).

7 Claims, 2 Drawing Sheets

(56) References Cited

U.S. PATENT DOCUMENTS

2020/0320056 A1* 10/2020 Manningham ...... G06F 16/9024
2021/0160056 A1* 5/2021 Yan ..................... H04L 63/126

FOREIGN PATENT DOCUMENTS

| CN | 112236987 A | * | 1/2021 | ............. G06F 21/57 |
| GB | 2583770 A | * | 11/2020 | ............ G06Q 20/065 |
| WO | WO-2020000011 A1 | * | 1/2020 | ......... G06F 16/2365 |

* cited by examiner

DISTRIBUTED CONSENSUS ALGORITHM AND APPARATUS FOR RAPIDLY GENERATING BLOCK

CROSS REFERENCE TO RELATED APPLICATION(S)

This application claims priority to Chinese Patent Application No. 201910491737.0, filed with the China National Intellectual Property Administration (CNIPA) on Jun. 6, 2019, which is incorporated herein by reference in its entirety.

TECHNICAL FIELD

The present disclosure relates to the field of blockchain technologies, and in particular, to a distributed consensus algorithm and apparatus for rapidly generating a block.

BACKGROUND ART

A blockchain initially gained attention as the basic technology of Bitcoin, and has now been applied to various fields and created global market value. Through technologies such as data encryption, time stamping, consensus mechanisms, and smart contracts, the blockchain realizes decentralized and trusted point-to-point transactions, coordination, and cooperation in a distributed system, to provide solutions for problems such as high costs, low efficiency, and insecure data storage in centralized organizations.

The blockchain is considered to be the fifth subversive computing paradigm following mainframe computers, personal computers, the Internet, and mobile social interaction, and the fourth milestone following blood relative credit, precious metal credit, and central bank paper credit in the history of human credit evolution. Maybe Bitcoin will disappear in the future, but due to its wide application prospect, the blockchain technologies will play a greater role.

However, when miners are selected in the consensus mechanism of the existing blockchain system, trust values of the miners are not considered, and consequently, malicious nodes participate in the creation of blocks, making it difficult to ensure the safety of the consensus mechanism.

SUMMARY

The present disclosure provides a distributed consensus algorithm and apparatus for rapidly generating a block, to resolve the technical problem that when miners are selected in the consensus mechanism of the existing blockchain system, trust values of the miners are not considered, and consequently, malicious nodes participate in the creation of blocks, resulting in the unguaranteed efficiency of the consensus mechanism.

In view of the foregoing problem, the embodiments of the present disclosure provide the distributed consensus algorithm and apparatus for rapidly generating a block.

According to a first aspect, the present disclosure provides the distributed consensus algorithm for rapidly generating a block, including: broadcasting a new transaction to all nodes; collecting, by each of the nodes, the new transaction into a block; evaluating a trust value of each of the nodes to obtain an evaluation result; selecting honest miners according to the evaluation result; obtaining negotiation rules; creating, by the honest miners, a new block according to the negotiation rules, and broadcasting the new block to all the nodes; and when all transactions in the nodes are valid but do not take effect, receiving the new block and adding the new block to a blockchain.

Preferably, the evaluating a trust value of each of the nodes to obtain an evaluation result includes: obtaining a proposer of the new block from all the nodes; obtaining a trust value of the proposer of the new block; obtaining a validator of the new block from all the nodes; obtaining a trust value of the validator of the new block; and obtaining the evaluation result according to the trust values of the proposer and the validator.

Preferably, the obtaining a trust value of the proposer of the new block includes: when one of the nodes is the proposer of the new block, a formula for evaluating the trust value of the node is:

$$PT_i = \frac{\theta * \eta_1}{f_i + 1} - \frac{f_i}{r_i + 1},$$

where parameters ($r_i$, $f_i$) respectively represent quantities of correct and incorrect blocks provided by the proposer, $\theta$ represents a trust threshold, a node with a trust value lower than $\theta$ is considered to be malicious, $\eta_1$ represents a system-tolerable quantity of incorrect blocks submitted by the proposer.

Preferably, the obtaining a trust value of the validator of the new block includes: when one of the nodes is the validator of the new block, a formula for evaluating the trust value of the node is:

$$VT_i = \frac{\theta * \eta_2}{w_i + 1} - \frac{w_i}{c_i + 1},$$

where parameters ($c_i$, $w_i$) respectively represent quantities of correct and incorrect votes provided by the validator, $\theta$ represents a trust threshold, $\eta_2$ represents a system-tolerable quantity of incorrect results submitted by the validator.

Preferably, a formula for obtaining the evaluation result according to the trust values of the proposer and the validator is:

$$T_i = \frac{\theta * (\eta_1 + \eta_2)}{f_i + w_i + 1} - \frac{f_i + w_i}{r_i + c_i + 1},$$

where $\theta$ represents a trust threshold, $\eta_1$ represents a system-tolerable quantity of incorrect blocks submitted by the proposer, $\eta_2$ represents a system-tolerable quantity of incorrect results submitted by the validator, f represents a quantity of incorrect blocks provided by the proposer, and $w_i$ represents a quantity of incorrect votes provided by the validator.

Preferably, the creating, by the honest miners, a new block according to the negotiation rules, and broadcasting the new block to all the nodes includes: separately selecting a proposer and a validator from the nodes according to the evaluation result, where the proposer and the validator are different nodes; transmitting first encrypted information to the proposer, where the first encrypted information includes ID information of the validator, and the first encrypted information does not include ID information of other proposers; transmitting second encrypted information to the validator, where the second encrypted information includes ID information of all the validators and all the proposers;

and broadcasting the new block to all the nodes according to the first encrypted information and the second encrypted information.

Preferably, after the selecting honest miners according to the evaluation result, the algorithm includes: obtaining trust values and life cycles of the honest miners; and updating the honest miners according to the trust values and the life cycles.

According to a second aspect, the present disclosure provides a distributed consensus apparatus for rapidly generating a block, including:

a first broadcast unit, configured to broadcast a new transaction to all nodes;

a first collection unit, configured to enable each of the nodes to collect the new transaction into a block;

a first obtaining unit, configured to evaluate a trust value of each of the nodes to obtain an evaluation result;

a first selection unit, configured to select honest miners according to the evaluation result;

a second obtaining unit, configured to obtain negotiation rules;

a second broadcast unit, configured to enable the honest miners to create a new block according to the negotiation rules and broadcast the new block to all the nodes; and a first adding unit, configured to, when all transactions in the nodes are valid but do not take effect, receive the new block and add the new block to a blockchain.

Preferably, the apparatus further includes:

a third obtaining unit, configured to obtain a proposer of the new block from all the nodes;

a fourth obtaining unit, configured to obtain a trust value of the proposer of the new block;

a fifth obtaining unit, configured to obtain a validator of the new block from all the nodes;

a sixth obtaining unit, configured to obtain a trust value of the validator of the new block; and a seventh obtaining unit, configured to obtain the evaluation result according to the trust values of the proposer and the validator.

Preferably, the apparatus further includes:

a first calculating unit, configured to, when one of the nodes is the proposer of the new block, evaluate the trust value of the node by using the following formula:

$$PT_i = \frac{\theta * \eta_1}{f_i + 1} - \frac{f_i}{r_i + 1},$$

where parameters ($r_i$, $f_i$) respectively represent quantities of correct and incorrect blocks provided by the proposer, $\theta$ represents a trust threshold, a node with a trust value lower than $\theta$ is considered to be malicious, $\eta_1$ represents a system-tolerable quantity of incorrect blocks submitted by the proposer.

Preferably, the apparatus further includes:

a second calculating unit, configured to, when one of the nodes is the validator of the new block, evaluate the trust value of the node by using the following formula:

$$VT_i = \frac{\theta * \eta_2}{w_i + 1} - \frac{w_i}{c_i + 1},$$

where parameters ($c_i$, $w_i$) respectively represent quantities of correct and incorrect votes provided by the validator, $\theta$ represents a trust threshold, $\eta_2$ represents a system-tolerable quantity of incorrect results submitted by the validator.

Preferably, the apparatus further includes:

a third calculating unit, configured to perform calculation by using the following formula $$T_i = \frac{\theta * (\eta_1 + \eta_2)}{f_i + w_i + 1} - \frac{f_i + w_i}{r_i + c_i + 1},$$

where $\theta$ represents a trust threshold, $\eta_1$ represents a system-tolerable quantity of incorrect blocks submitted by the proposer, $\eta_2$ represents a system-tolerable quantity of incorrect results submitted by the validator, $f_i$ represents a quantity of incorrect blocks provided by the proposer, and $w_i$ represents a quantity of incorrect votes provided by the validator.

Preferably, the apparatus further includes:

a first extracting unit, configured to separately select a proposer and a validator from the nodes according to the evaluation result, where the proposer and the validator are different nodes;

a first transmission unit, configured to transmit first encrypted information to the proposer, where the first encrypted information includes ID information of the validator, and the first encrypted information does not include ID information of other proposers;

a second transmission unit, configured to transmit second encrypted information to the validator, where the second encrypted information includes ID information of all the validators and all the proposers; and a third broadcast unit, configured to broadcast the new block to all the nodes according to the first encrypted information and the second encrypted information.

Preferably, the apparatus further includes:

an eighth obtaining unit, configured to obtain trust values and life cycles of the honest miners; and a first updating unit, configured to update the honest miners according to the trust values and the life cycles.

According to a third aspect, the present disclosure provides a distributed consensus apparatus for rapidly generating a block, including a memory, a processor, and a computer program stored on the memory and run on the processor, where when executing the program, the processor performs the following steps: broadcasting a new transaction to all nodes; collecting, by each of the nodes, the new transaction into a block; evaluating a trust value of each of the nodes to obtain an evaluation result; selecting honest miners according to the evaluation result; obtaining negotiation rules; creating, by the honest miners, a new block according to the negotiation rules, and broadcasting the new block to all the nodes; and when all transactions in the nodes are valid but do not take effect, receiving the new block and adding the new block to a blockchain.

According to a fourth aspect, the present disclosure provides a computer readable storage medium, storing a computer program, where when executed by a processor, the program performs the following steps: broadcasting a new transaction to all nodes; collecting, by each of the nodes, the new transaction into a block; evaluating a trust value of each of the nodes to obtain an evaluation result; selecting honest miners according to the evaluation result; obtaining negotiation rules; creating, by the honest miners, a new block according to the negotiation rules, and broadcasting the new block to all the nodes; and when all transactions in the nodes are valid but do not take effect, receiving the new block and adding the new block to a blockchain.

The forgoing one or more technical solutions in the embodiments of the present disclosure include at least one or more of the following technical effects:

The embodiments of the present disclosure provide a distributed consensus algorithm and apparatus for rapidly generating a block. The algorithm includes: broadcasting a new transaction to all nodes; collecting, by each of the nodes, the new transaction into a block; evaluating a trust value of each of the nodes to obtain an evaluation result; selecting honest miners according to the evaluation result; obtaining negotiation rules; creating, by the honest miners, a new block according to the negotiation rules, and broadcasting the new block to all the nodes; and when all transactions in the nodes are valid but do not take effect, receiving the new block and adding the new block to a blockchain. The algorithm is used to resolve the technical problem that when miners are selected in the consensus mechanism of the existing blockchain system, trust values of the miners are not considered, and consequently, malicious nodes participate in the creation of blocks, resulting in the unguaranteed efficiency of the consensus mechanism, thereby achieving the technical effect that the trust values of nodes are evaluated to effectively identify malicious miners, thereby improving the efficiency of the consensus mechanism.

The above description is merely a summary of the technical solutions of the present disclosure. In order to make the technical means of the present disclosure to be understood more clearly and implemented in accordance with the content of the specification, and in order to make the above and other objectives, features and advantages of the present disclosure more obvious and easier to understand, specific implementations of the present disclosure are described below.

Figure 1:
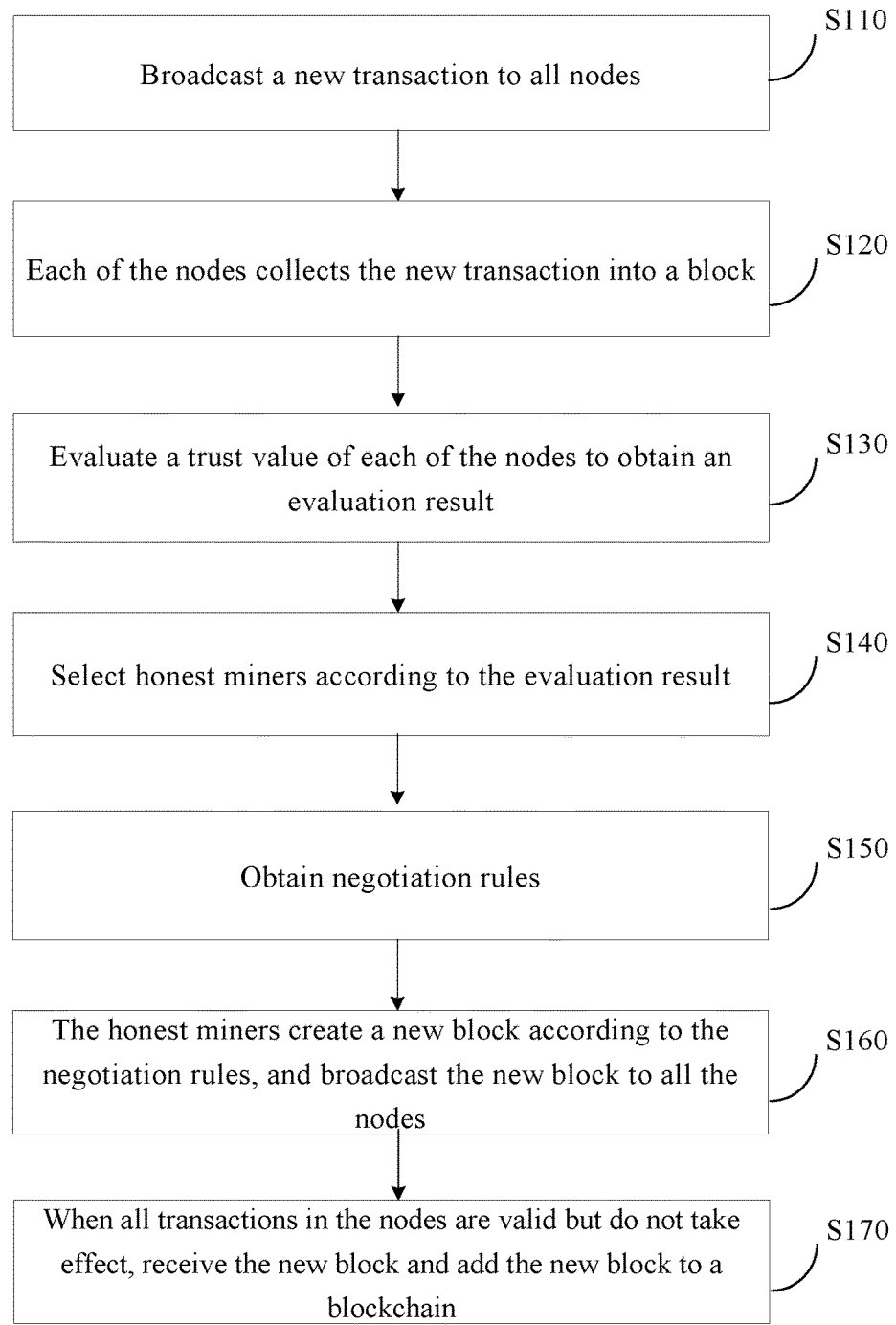
FIG. 1 is a schematic flowchart of a distributed consensus algorithm for rapidly generating a block according to an embodiment of the present disclosure.

Reference numerals are described as follows: a first broadcast unit 11, a first collection unit 12, a first obtaining unit 13, a first selection unit 14, a second obtaining unit 15, a second broadcast unit 16, a first adding unit 17, a bus 300, a receiver 301, a processor 302, a transmitter 303, a memory 304, and a bus interface 306.

DETAILED DESCRIPTION OF THE EMBODIMENTS

Embodiments of the present disclosure provide a distributed consensus algorithm and apparatus for rapidly generating a block, to resolve the technical problem that when miners are selected in the consensus mechanism of the existing blockchain system, trust values of the miners are not considered, and consequently, malicious nodes participate in the creation of blocks, resulting in the unguaranteed efficiency of the consensus mechanism.

The general idea of the technical solutions in the embodiments of the present disclosure is as follows:

broadcasting a new transaction to all nodes; collecting, by each of the nodes, the new transaction into a block; evaluating a trust value of each of the nodes to obtain an evaluation result; selecting honest miners according to the evaluation result; obtaining negotiation rules; creating, by the honest miners, a new block according to the negotiation rules, and broadcasting the new block to all the nodes; and when all transactions in the nodes are valid but do not take effect, receiving the new block and adding the new block to a blockchain, thereby achieving the technical effect that the trust values of nodes are evaluated to effectively identify malicious miners, thereby improving the efficiency of the consensus mechanism.

It should be understood that the consensus mechanism described in the embodiments of the present disclosure refers to an algorithm for achieving distributed consensus in blockchain transactions.

It should be understood that the blockchain in embodiments of the present disclosure is a decentralized distributed ledger system, which can be used to register and issue digital assets, property right certificates, points, and the like, and transfer, pay, and trade in a point-to-point manner. Compared with the traditional centralized ledger system, the blockchain system has the advantages of being completely open and non-tamperable, preventing a plurality of payments, and the like, and does not rely on any trusted third party.

It should be understood that the miners in the embodiments of the present disclosure are nodes responsible for creating blocks in the consensus mechanism.

The technical solutions in the present disclosure are described in detail with reference to the accompanying drawings and specific embodiments. It should be understood that the embodiments in the present disclosure and specific features in the embodiments are detailed descriptions of the technical solutions in the present disclosure, and are not intended to limit the technical solutions in the present disclosure. The embodiments in the present disclosure and technical features in the embodiments may be combined with each other in a non-conflicting situation.

The term "and/or" in this specification merely describes associations between associated objects, and it indicates three types of relationships. For example, A and/or B may indicate that A exists alone, A and B coexist, or B exists alone. In addition, the character "/" in this specification generally indicates that the associated objects are in an "or" relationship.

Embodiment 1

FIG. 1 is a schematic flowchart of a distributed consensus algorithm for rapidly generating a block according to an embodiment of the present disclosure. As shown in FIG. 1, the algorithm includes the following steps.

Step 110. Broadcast a new transaction to all nodes.

Specifically, a blockchain, which is an important concept of Bitcoin, is essentially a decentralized database. In this case, as the underlying technology of Bitcoin, the blockchain is a series of data blocks that are related and generated by using the cryptographic method. Each data block includes a batch of Bitcoin network transaction information and is used to verify the validity of the information (anti-counterfeiting) and generate the next block. The new transaction is the Bitcoin network transaction described in the above blockchain, and those skilled in the art should understand that the node described in this application is a well-known word in the blockchain.

Step 120. Each of the nodes collects the new transaction into a block.

Specifically, the blockchain is formed by the blocks, and the blocks include new transaction information collected by nodes.

Step 130. Evaluate a trust value of each of the nodes to obtain an evaluation result.

Further, the step of evaluating a trust value of each of the nodes to obtain an evaluation result includes: obtaining a proposer of the new block from all the nodes; obtaining a trust value of the proposer of the new block; obtaining a validator of the new block from all the nodes; obtaining a trust value of the validator of the new block; and obtaining the evaluation result according to the trust values of the proposer and the validator.

Specifically, the embodiment of the present application introduces trust management into the blockchain network to securely guarantee the generation of new blocks. A high trust value means that it is acceptable for a miner to play as a proposer or a validator. When the miners always act honestly, they get quite high trust values. Once some miners start malicious actions, their trust values drop soon. The proposers are responsible for proposing a block and transmit the block to the validators. The validators check the correctness of the block and transmit verification votes to each other. When the majority of validators approve the verification, they accept the block and link the new block to the blockchain. A case that a malicious miner is elected as a proposer or a validator to submit an incorrect block or transmit an incorrect vote must be considered. To distinguish between malicious miners and honest miners, trust management may be used to evaluate the credibility of miners. If the malicious miners always provide false blocks or incorrect votes, they obtain trust values lower than those of the honest miners. In this case, a new trust evaluation scheme is designed for the blockchain network.

Further, the obtaining a trust value of the proposer of the new block includes: when one of the nodes is the proposer of the new block, a formula for evaluating the trust value of the node is:

$$PT_i = \frac{\theta * \eta_1}{f_i + 1} - \frac{f_i}{r_i + 1},$$

where parameters ($r_i$, $f_i$) respectively represent quantities of correct and incorrect blocks provided by the proposer, $\theta$ represents a trust threshold, a node with a trust value lower than $\theta$ is considered to be malicious, $\eta_1$ represents a system-tolerable quantity of incorrect blocks submitted by the proposer.

Specifically, using an $i^{th}$ miner ($M_i$) as an example, the parameters ($r_i$, $f_i$) respectively represent quantities of correct blocks and incorrect blocks provided by $M_i$. If the validator verifies the block provided by $M_i$ as false, $f_i$ increases by 1. If the block is verified as true, $r_i$ increases by 1. In some environments, the system is extremely sensitive to the action of submitting false blocks. In this case, $\eta_1$ should be set to 1. This means that if $M_i$ provides a false block, the system does not choose $M_i$ as a proposer again. If the tolerance for block frauds is relatively high, $\eta_1 > 1$ may be set.

Further, the obtaining a trust value of the validator of the new block includes: when one of the nodes is the validator of the new block, a formula for evaluating the trust value of the node is:

$$VT_i = \frac{\theta * \eta_2}{w_i + 1} - \frac{w_i}{c_i + 1},$$

where parameters ($c_i$, $w_i$) respectively represent quantities of correct and incorrect votes provided by the validator, $\theta$ represents a trust threshold, $\eta_2$ represents a system-tolerable quantity of incorrect results submitted by the validator.

Specifically, if the system is extremely sensitive to incorrect voting action, $\eta_2$ should be set to a relatively low value, and vice versa. The present application does not limit the specific value of $\eta_2$.

Further, a formula for obtaining the evaluation result according to the trust values of the proposer and the validator is:

$$T_i = \frac{\theta * (\eta_1 + \eta_2)}{f_i + w_i + 1} - \frac{f_i + w_i}{r_i + c_i + 1},$$

where $\theta$ represents a trust threshold, $\eta_1$ represents a system-tolerable quantity of incorrect blocks submitted by the proposer, $\eta_2$ represents a system-tolerable quantity of incorrect results submitted by the validator, $f_i$ represents a quantity of incorrect blocks provided by the proposer, and $w_i$ represents a quantity of incorrect votes provided by the validator.

Specifically, it can be seen from the above formula that if $M_i$ does not commit fraud, that is, if $f_i = w_i = 0$, the $P_{Ti}$, $VT_i$, and $T_i$ of $M_i$ are always greater than $\theta$. For example, to combat malicious miners, three punishment policies may be adopted: −P1: If $PT_i < \theta$, $M_i$ cannot be selected as a proposer; −P2: If $VT_i < \theta$, $M_i$ cannot be selected as a validator; and −P3: If $T_i < \theta$, $M_i$ is removed from the miner team.

Step 140. Select honest miners according to the evaluation result.

Specifically, the honest miners, that is, proposers and validators that create new blocks are selected from a miner team including most nodes in the network. A trusted random selection algorithm is to select some miners with high trust values as proposers and validators from a miner team to participate in the creation of a new block. The trusted random selection algorithm is used not only to select proposers and validators with high trust values, where the levels of the trust values determine whether the miners are honest, but also to avoid increasing communication overload of the consensus mechanism. In this case, the algorithm selects proposers and validators for the creation of new blocks. The honest miners include proposers and validators. The proposers are responsible for proposing a block and transmit the block to the validators. The validators check the correctness of the block and transmit verification votes to each other. When the majority of validators approve the verification, they accept the block and link the new block to the blockchain.

Step 150. Obtain negotiation rules.

Specifically, to implement the fast and effective consensus mechanism in a distributed system, all miners in the blockchain network must abide by the negotiation rule executed by a smart contract.

Detailed rules are as follows:

Rule 1: A quantity of miners in the network meets the following formula: $|\Phi| > n/2$, where $\Phi$ represents the quantity of miners, and n represents a quantity of nodes in the blockchain network.

Rule 2: The miners must be updated according to their trust values and life cycles. When their trust values are lower than a threshold, or their lifespans expire, the miners are eliminated.

Rule 3: During the creation of a new block, proposers and validators must be randomly selected from miners with high trust values.

Rule 4: During the creation of the new block, a plurality of proposers should be selected to be responsible for proposing the new block, and it is ensured that different proposers do not understand each other and do not interfere with each other.

Rule 5: During the creation of the new block, some miners are selected as validators to verify the validity of the new block and transmit verification results to each other. Each of the selected miners can only play as a proposer or a validator.

After obtained, the negotiation rules can be used to run the consensus mechanism.

Step 160. The honest miners create a new block according to the negotiation rules, and broadcast the new block to all the nodes.

Further, the step in which the honest miners create the new block according to the negotiation rules, and broadcast the new block to all the nodes includes: separately selecting a proposer and a validator from the nodes according to the evaluation result, where the proposer and the validator are different nodes; transmitting first encrypted information to the proposer, where the first encrypted information includes ID information of the validator, and the first encrypted information does not include ID information of other proposers; transmitting second encrypted information to the validator, where the second encrypted information includes ID information of all the validators and all the proposers; and broadcasting the new block to all the nodes according to the first encrypted information and the second encrypted information.

Specifically, when the blockchain network is established, actions of all nodes are unknown. Therefore, more than 51% of nodes are randomly selected from the network to form a miner team ($\Phi$). With the development of the blockchain network, the miner team is constantly optimized. In the blockchain network, if all miners implement the consensus protocol to participate in the creation of the new block, the miners are immobilized, and the consensus mechanism communication is overloaded, because most nodes in the network always transmits information. Therefore, some miners with high trust values are selected as the proposers and validators from the miner team ($\Phi$) to participate in the creation of the new block, and it is ensured that the selected miners do not understand each other, to realize the rapid and effective consensus mechanism.

At the end of the current round of block creation, the proposers and validators for the next round are selected by using two methods: One is to use smart contract to keep the entire blockchain network running, and therefore the smart contract may be used to execute the algorithm. The other is to use the miner with the highest trust value to execute the algorithm. If there are a plurality of miners with the same highest trust value, one of them is selected randomly.

Once the proposers and validators are selected for the next block, first encrypted information is transmitted to the proposers, and second encrypted information is transmitted to the validators. To ensure the security of transmission, all notification messages need to be encrypted by using a public key According to rule 4, the proposer $M_i$ is selected to receive an encrypted notification message including IDs of the validators, that is, the first encrypted information, but the first encrypted information does not contain the IDs of other proposers. $M_i$ can use its private key to decrypt the notification message. Because $M_i$ does not know the IDs of the other proposers, it can prevent the proposers from colluding to submit false blocks. According to rule 5, a validator such as $M_j$ is selected to receive an encrypted message including IDs of the validators and proposers, that is, the second encrypted information. $M_j$ can use its private key to decrypt the notification message. Because $M_j$ knows the IDs of all the proposers, it can prevent malicious nodes from impersonating the proposers.

Further, after the honest miners are selected according to the evaluation result, the algorithm includes: obtaining trust values and life cycles of the honest miners; and updating the honest miners according to the trust values and the life cycles.

Specifically, the miner team is continuously updated with the development of the blockchain network. The miner team $\Phi$ can be updated according to rule 1 and rule 2.

Step 170. When all transactions in the nodes are valid but do not take effect, receive the new block and add the new block to a blockchain.

Specifically, when all transactions in the nodes are valid and do not take effect, other nodes accept the new block and add the new block to the chain. The hash value of the new block is used as the head hash value of the next block. The hash value, also referred to as a hash function (or a hash algorithm) is a method of creating a small digital "fingerprint" from any kind of data. The hash function compresses messages or data into a digest, so that the amount of data becomes smaller, and the format of the data is fixed. This function scrambles and mixes data and recreates a fingerprint referred to as hash values (hash codes, hash sums, or hashes). The hash value is usually represented by using a short string formed by a random letter and a number.

Through the technical solutions provided by the embodiments of the present application, trust management is introduced into the blockchain network to securely guarantee the generation of the new block. The proposers and validators that create the new block are selected from the miner team formed by most nodes in the network. The trusted random selection algorithm is used not only to select proposers and validators with high trust values, but also to avoid increasing communication overload of the consensus mechanism. Different proposers do not interfere with each other, to prevent a plurality of proposers from colluding to commit fraud, while the miner team is updated in real time, thereby improving the efficiency of the consensus mechanism and ensuring the technical effect of the consensus mechanism running quickly in the blockchain network.

Embodiment 2

Figure 2:
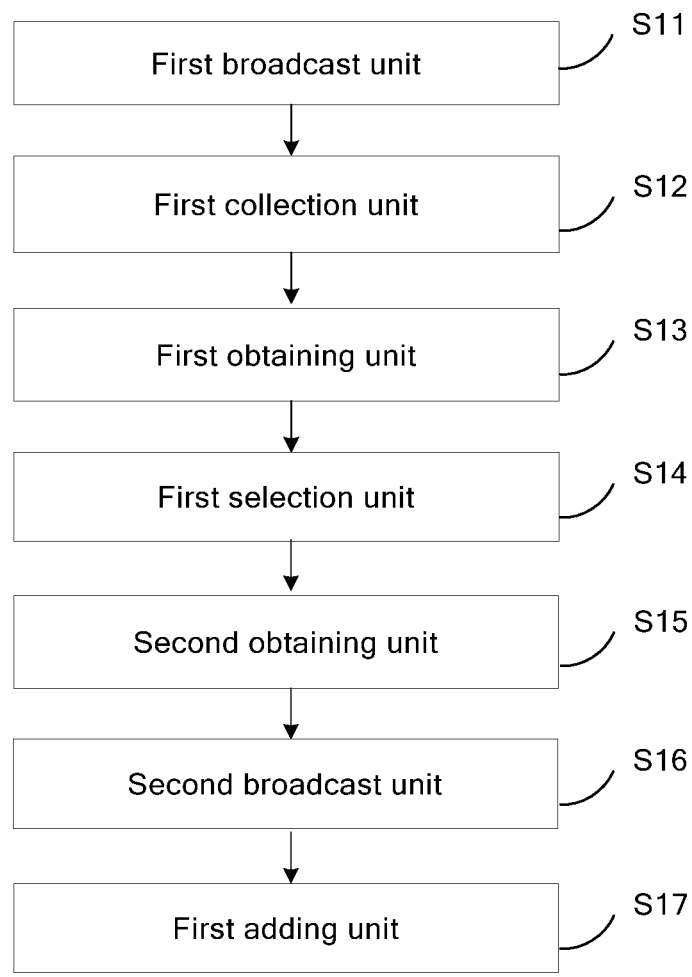
FIG. 2 is a schematic structural diagram of a distributed consensus apparatus for rapidly generating a block according to an embodiment of the present disclosure.

Based on the same invention concept of the distributed consensus algorithm for rapidly generating a block in the foregoing embodiment, the present disclosure also provides a distributed consensus apparatus for rapidly generating a block. As shown in FIG. 2, the apparatus includes:

a first broadcast unit 11, configured to broadcast a new transaction to all nodes;

a first collection unit 12, configured to enable each of the nodes to collect the new transaction into a block;

a first obtaining unit 13, configured to evaluate a trust value of each of the nodes to obtain an evaluation result;

a first selection unit 14, configured to select honest miners according to the evaluation result;

a second obtaining unit 15, configured to obtain negotiation rules;

a second broadcast unit 16, configured to enable the honest miners to create a new block according to the negotiation rules and broadcast the new block to all the nodes; and a first adding unit 17, configured to, when all transactions in the nodes are valid but do not take effect, receive the new block and add the new block to a blockchain.

Preferably, the apparatus further includes:

a third obtaining unit, configured to obtain a proposer of the new block from all the nodes;

a fourth obtaining unit, configured to obtain a trust value of the proposer of the new block;

a fifth obtaining unit, configured to obtain a validator of the new block from all the nodes;

a sixth obtaining unit, configured to obtain a trust value of the validator of the new block; and a seventh obtaining unit, configured to obtain the evaluation result according to the trust values of the proposer and the validator.

Preferably, the apparatus further includes:

a first calculating unit, configured to, when one of the nodes is the proposer of the new block, evaluate the trust value of the node by using the following formula:

$$PT_i = \frac{\theta * \eta_1}{f_i + 1} - \frac{f_i}{r_i + 1},$$

where parameters ($r_i$, $f_i$) respectively represent quantities of correct and incorrect blocks provided by the proposer, $\theta$ represents a trust threshold, a node with a trust value lower than $\theta$ is considered to be malicious, $\eta_1$ represents a system-tolerable quantity of incorrect blocks submitted by the proposer.

Preferably, the apparatus further includes:

a second calculating unit, configured to, when one of the nodes is the validator of the new block, evaluate the trust value of the node by using the following formula:

$$VT_i = \frac{\theta * \eta_2}{w_i + 1} - \frac{w_i}{c_i + 1},$$

where parameters ($c_i$, $w_i$) respectively represent quantities of correct and incorrect votes provided by the validator, $\theta$ represents a trust threshold, $\eta_2$ represents a system-tolerable quantity of incorrect results submitted by the validator.

Preferably, the apparatus further includes:

a third calculating unit, configured to perform calculation by using the following formula $$T_i = \frac{\theta * (\eta_1 + \eta_2)}{f_i + w_i + 1} - \frac{f_i + w_i}{r_i + c_i + 1},$$

where $\theta$ represents a trust threshold, $\eta_1$ represents a system-tolerable quantity of incorrect blocks submitted by the proposer, $\eta_2$ represents a system-tolerable quantity of incorrect results submitted by the validator, $f_i$ represents a quantity of incorrect blocks provided by the proposer, and $w_i$ represents a quantity of incorrect votes provided by the validator.

Preferably, the apparatus further includes:

a first extracting unit, configured to separately select a proposer and a validator from the nodes according to the evaluation result, where the proposer and the validator are different nodes;

a first transmission unit, configured to transmit first encrypted information to the proposer, where the first encrypted information includes ID information of the validator, and the first encrypted information does not include ID information of other proposers;

a second transmission unit, configured to transmit second encrypted information to the validator, where the second encrypted information includes ID information of all the validators and all the proposers; and a third broadcast unit, configured to broadcast the new block to all the nodes according to the first encrypted information and the second encrypted information.

Preferably, the apparatus further includes:

an eighth obtaining unit, configured to obtain trust values and life cycles of the honest miners; and a first updating unit, configured to update the honest miners according to the trust values and the life cycles.

The various changes and specific examples of the distributed consensus algorithm for rapidly generating a block in Embodiment 1 in FIG. 1 are also applicable to the distributed consensus apparatus for rapidly generating a block in this embodiment. Through the foregoing detailed description of the distributed consensus algorithm for rapidly generating a block, those skilled in the art can clearly know the implementation algorithm of the distributed consensus apparatus for rapidly generating a block in this embodiment. Therefore, the implementation algorithm is not described in detail for the simplicity of the specification.

Embodiment 3

Based on the same invention concept of the distributed consensus algorithm for rapidly generating a block in the foregoing embodiment, the present disclosure also provides a distributed consensus apparatus for rapidly generating a block, storing a computer program. When executed by a processor, the program performs the steps of any algorithm of the foregoing described distributed consensus algorithm for rapidly generating a block.

Figure 3:
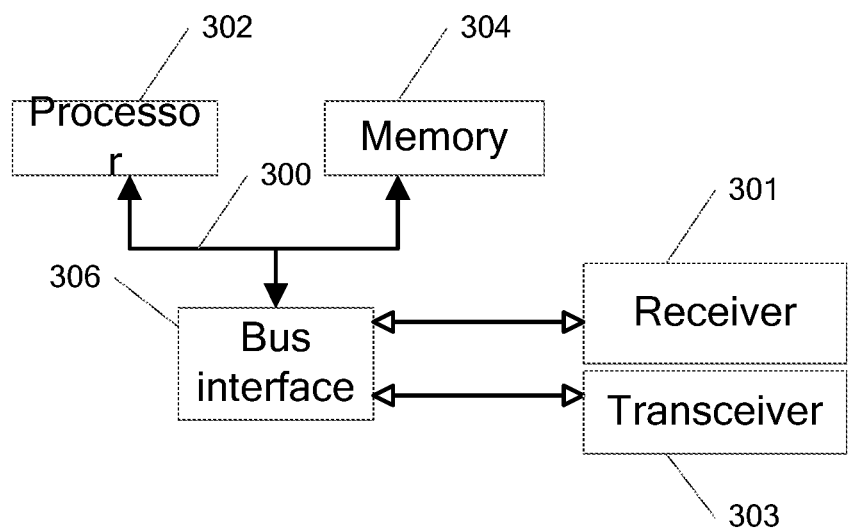
FIG. 3 is a schematic structural diagram of another distributed consensus apparatus for rapidly generating a block according to an embodiment of the present disclosure.

In FIG. 3, a bus architecture (represented by using a bus 300) may include any quantity of interconnected buses and bridges. The bus 300 connects one or more processors represented by the processor 302 to various circuits of a memory represented by the memory 304. The bus 300 may also connect various other circuits such as peripheral devices, voltage regulators, and power management circuits. This is known in the art, and therefore is not further described in this present disclosure. A bus interface 306 provides an interface among the bus 300, a receiver 301, and a transmitter 303. The receiver 301 and the transmitter 303 may be the same element, that is, a transceiver, which provides a unit communicating with various other devices on a transmission medium.

The processor 302 is responsible for managing the bus 300 and general processing, and the memory 304 may be used to store data used by the processor 302 when performing operations.

The forgoing one or more technical solutions in the embodiments of the present disclosure include at least one or more of the following technical effects:

The embodiments of the present disclosure provide a distributed consensus algorithm and apparatus for rapidly generating a block. The algorithm includes: broadcasting a new transaction to all nodes; collecting, by each of the nodes, the new transaction into a block; evaluating a trust value of each of the nodes to obtain an evaluation result; selecting honest miners according to the evaluation result; obtaining negotiation rules; creating, by the honest miners, a new block according to the negotiation rules, and broadcasting the new block to all the nodes; and when all transactions in the nodes are valid but do not take effect, receiving the new block and adding the new block to a blockchain. The algorithm is used to resolve the technical problem that when miners are selected in the consensus mechanism of the existing blockchain system, trust values of the miners are not considered, and consequently, malicious nodes participate in the creation of blocks, resulting in the unguaranteed efficiency of the consensus mechanism, thereby achieving the technical effect that the trust values of nodes are evaluated to effectively identify malicious miners, thereby improving the efficiency of the consensus mechanism.

Persons skilled in the art should understand that the embodiments of the present disclosure may be provided as an algorithm, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, CD-ROM, an optical memory, and the like) that include computer-usable program code.

The present disclosure is described with reference to the flowcharts and/or block diagrams of the algorithm, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, those skilled in the art can make various alterations and modifications to the present disclosure without departing from the spirit and scope of the present disclosure. Thus, if these alterations and modifications of the present disclosure fall within the scope of the claims of the present disclosure and equivalent technologies thereof, the present disclosure will be further intended to include these alterations and modifications.

What is claimed is:

1. A distributed consensus method for rapidly generating a block, comprising:
broadcasting, by a computer, a new transaction to all nodes;
collecting, by each of the nodes, the new transaction into a block;
evaluating, by the computer, a trust value of each of the nodes to obtain an evaluation result;
wherein evaluating the trust value of each of the nodes to obtain the evaluation result comprises:
  obtaining, by the computer, a proposer of the block from all the nodes;
  obtaining, by the computer, a trust value of the proposer of the block;
  obtaining, by the computer, a validator of the block from all the nodes;
  obtaining, by the computer, a trust value of the validator of the block; and
  obtaining, by the computer, the evaluation result according to the trust values of the proposer and the validator;
wherein a formula for obtaining, by the computer, the evaluation result according to the trust values of the proposer and the validator is:

$$T_i = \frac{\theta*(\eta_1 + \eta_2)}{f_i + w_i + 1} - \frac{f_i + w_i}{r_i + c_i + 1},$$

wherein $\theta$ represents a trust threshold, $\eta_1$ represents a system-tolerable quantity of incorrect blocks submitted by the proposer, $\eta_2$ represents a system-tolerable quantity of incorrect results submitted by the validator, $f_i$ represents a quantity of incorrect blocks provided by the proposer, and $w_i$ represents a quantity of incorrect votes provided by the validator,
selecting, by the computer, honest miners nodes according to the evaluation result;
obtaining, by the honest miners nodes, negotiation rules;
creating, by the honest miners nodes, a new block according to the negotiation rules, and broadcasting the new block to all the nodes; and
wherein all transactions in the nodes are valid but do not take effect, accepting, by all the nodes, the new block and adding the new block to a blockchain.

2. The method according to claim 1, wherein the obtaining a trust value of the proposer of the new block comprises:
when one of the nodes is the proposer of the new block, a formula for evaluating the trust value of the node is:

$$PT_i = \frac{\theta*\eta_1}{f_i + 1} - \frac{f_i}{r_i + 1},$$

wherein parameters ($r_i$, $f_i$) respectively represent quantities of correct and incorrect blocks provided by the proposer, θ represents a trust threshold, $\eta_1$ represents a system-tolerable quantity of incorrect blocks submitted by the proposer.

3. The method according to claim 1, wherein the obtaining a trust value of the validator of the new block comprises: when one of the nodes is the validator of the new block, a formula for evaluating the trust value of the node is:

$$VT_i = \frac{\theta * \eta_2}{w_i + 1} - \frac{w_i}{c_i + 1},$$

wherein parameters ($c_i$, $w_i$) respectively represent quantities of correct and incorrect votes provided by the validator, θ represents a trust threshold, $\eta_2$ represents a system-tolerable quantity of incorrect results submitted by the validator.

4. The method according to claim 1, wherein the creating, by the honest miners, a new block according to the negotiation rules, and broadcasting the new block to all the nodes comprises:
separately selecting a proposer and a validator from the nodes according to the evaluation result, wherein the proposer and the validator are different nodes;
transmitting first encrypted information to the proposer, wherein the first encrypted information comprises ID information of the validator, and the first encrypted information does not comprise ID information of other proposers;
transmitting second encrypted information to the validator, wherein the second encrypted information comprises ID information of all the validators and all the proposers; and
broadcasting the new block to all the nodes according to the first encrypted information and the second encrypted information.

5. The method according to claim 1, after the selecting honest miners nodes according to the evaluation result, comprising:
obtaining trust values and life cycles of the honest miners; and
updating the honest miners nodes according to the trust values and the life cycles.

6. The method according to claim 1, wherein the negotiation rules comprise the following rules:
rule 1: a quantity of miners in the network meets the following formula: |φ|>n/2, wherein φ represents the quantity of miners, and n represents a quantity of nodes in the blockchain network;
rule 2: the miners must be updated according to their trust values and life cycles, and when their trust values are lower than a threshold, or their lifespans expire, the miners are eliminated;
rule 3: during the creation of a new block, proposers and validators must be randomly selected from miners with high trust values; and
rule 4: during the creation of the new block, a plurality of proposers should be selected to be responsible for proposing the new block, and it is ensured that different proposers do not understand each other and do not interfere with each other, rule 5: during the creation of the new block, some miners are selected as validators to verify the validity of the new block and transmit verification results to each other, and each of the selected miners only play as a proposer or a validator.

7. A distributed consensus system for rapidly generating a block, comprising:
a computer comprising:
a computer processor; and
a computer memory, the computer memory storing instructions that, when executed by the computer processor, cause the computer processor to execute:
a first broadcast unit, configured to broadcast a new transaction to all nodes;
a first collection unit, configured to enable each of the nodes to collect the new transaction into a block;
a first obtaining unit, configured to evaluate a trust value of each of the nodes to obtain an evaluation result;
wherein evaluating the trust value of each of the nodes to obtain the evaluation result comprises:
obtaining a proposer of the block from all the nodes;
obtaining a trust value of the proposer of the block;
obtaining a validator of the block from all the nodes;
obtaining a trust value of the validator of the block; and
obtaining the evaluation result according to the trust values of the proposer and the validator;
wherein a formula for obtaining the evaluation result according to the trust values of the proposer and the validator is:

$$T_i = \frac{\theta * (\eta_1 + \eta_2)}{f_i + w_i + 1} - \frac{f_i + w_i}{r_i + c_i + 1},$$

wherein θ represents a trust threshold, $\eta_1$ represents a system-tolerable quantity of incorrect blocks submitted by the proposer, $\eta_2$ represents a system-tolerable quantity of incorrect results submitted by the validator, $f_i$ represents a quantity of incorrect blocks provided by the proposer, and $w_i$ represents a quantity of incorrect votes provided by the validator,
a first selection unit, configured to select honest miners nodes according to the evaluation result; and
honest miners nodes comprising:
one or more honest miners nodes processors; and
one or more honest miners nodes memory storing instructions that, when executed by the one or more honest miners nodes processors, cause the one or more honest miners nodes processors to execute:
a second obtaining unit, configured to obtain negotiation rules;
a second broadcast unit, configured to enable the honest miners nodes to create a new block according to the negotiation rules and broadcast the new block to all the nodes; and
a first adding unit, configured to, wherein all transactions in the nodes are valid but do not take effect, accepting, by all the nodes, the new block and add the new block to a blockchain.

* * * * *